US006700390B2

(12) United States Patent
Gauthier et al.

(10) Patent No.: US 6,700,390 B2
(45) Date of Patent: Mar. 2, 2004

(54) ADJUSTMENT AND CALIBRATION SYSTEM TO STORE RESISTANCE SETTINGS TO CONTROL CHIP/PACKAGE RESONANCE

(75) Inventors: Claude R. Gauthier, Fremont, CA (US); Brian W. Amick, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/160,349

(22) Filed: May 31, 2002

(65) Prior Publication Data

US 2003/0222655 A1 Dec. 4, 2003

(51) Int. Cl.$^7$ .......................... G01R 27/00

(52) U.S. Cl. .......................... 324/600

(58) Field of Search .......................... 324/600, 765, 324/713, 714, 771, 601; 361/111; 702/57–61; 307/31–34

(56) References Cited

U.S. PATENT DOCUMENTS 5,844,762 A * 12/1998 Yamamura et al. .......... 361/111

* cited by examiner

*Primary Examiner*—N. Le
*Assistant Examiner*—Amy He
(74) *Attorney, Agent, or Firm*—Rosenthal & Osha L.L.P.

(57) ABSTRACT

A adjustment and calibration system for reducing an impedance of a power supply path of an integrated circuit is provided. The power supply path includes a first power supply line and a second power supply line to provide power to the integrated circuit. At least a digital potentiometer connected between the first power supply line and the second power supply line is adjusted to reduce the impedance of the power supply path. Control information, representative of a desired value for the digital potentiometer, is stored in a storage device. The control information stored in the storage device is subsequently selectively read out in order to adjust the digital potentiometer to a state corresponding to the control information.

10 Claims, 6 Drawing Sheets

ADJUSTMENT AND CALIBRATION SYSTEM TO STORE RESISTANCE SETTINGS TO CONTROL CHIP/PACKAGE RESONANCE

BACKGROUND OF INVENTION

Power supplied to a central processing unit (CPU) occurs through a power distribution network. The power distribution network starts with a power supply that generates an appropriate DC voltage. The power supplied to the CPU must traverse from the power supply and across the power distribution network before it reaches the CPU. The power distribution network has characteristics that may affect the operation of the CPU.

FIG. 1 shows a depiction of a conventional CPU system (10). The CPU system (10) includes a printed circuit board (PCB) (12). The PCB (12) is a central platform on which various components are mounted. The PCB (12) has multiple layers that contain traces that connect the power supply and signals to the various components mounted on the PCB (12). Two layers, a system power supply layer (14) and a system ground layer (16), are shown in FIG. 1.

The system power supply layer (14) and the system ground layer (16) provide power to a CPU (20). The power supplied to the CPU (20) must traverse from a DC source (not shown) to a package (18) on which the CPU (20) is mounted using the system power supply layer (14) and the system ground layer (16). Other components are also mounted on the PCB (12) that generally attempt to maintain a constant voltage supplied to the CPU (20). These components may include, but are not limited to, an air-core inductor (24), a power supply regulating integrated circuit (26), switching transistors (28), a tantalum capacitor (30), and electrolytic capacitors (32).

In FIG. 1, the power supplied to the CPU (20) traverses from the DC source (not shown) and across the power distribution network created by the system power supply layer (14) and the system ground layer (16). Each layer (14, 16) creates a plane within the PCB (12). A variety of different types and different locations of capacitors are used to help maintain a constant voltage supplied to the CPU (20). Electrolytic capacitors (32) mounted on the PCB (12) connect between the system power supply layer (14) and the system ground layer (16). The package (18), similar to the PCB, may include multiple planes and interconnections between the planes to provide a connective substrate in which power and signals traverse. Ceramic capacitors (22) mounted on the package (18) connect between a package power supply signal (not shown) and a package ground signal (not shown).

Due to active switching of circuit elements on the CPU (20), the power required by the CPU (20) changes. The active switching causes power supply noise. Additional components may be included to minimize the power supply noise generated by the CPU. For example, ceramic capacitors (22) near the CPU (20) act as local power supplies by storing charge.

The addition of components reduces the power supply impedance at most frequencies; however, localized impedance peaks may exist. The impedance peaks indicate a resonance in the power distribution network. The resonance is formed when parasitics in the power distribution network and components connected to the power distribution network are excited at a particular frequency.

The parasitics include the inherent inductance, resistance, and capacitance that may occur in the CPU (20) (or other chips or integrated circuits), package (18), and power distribution network. In particular, the resonance may be formed from the power distribution network and a "parasitic tank circuit" that includes the chip capacitance and package inductance.

FIG. 2 shows a prior art schematic of a power distribution network for a CPU. A DC power supply (202) is shown at the left. Two power supply lines (292, 294) supply power to a CPU located between the two power supply lines (292, 294). The circuit elements between the DC power supply (202) and the power supply lines (292, 294) model both the inherent parasitics of the power distribution network and added components.

In FIG. 2, the DC power supply (202) connects to the power distribution network through a power supply connector. The power supply connector has inherent parasitics modeled by resistors (204, 208) and inductors (206, 210). The electrolytic capacitors (32 in FIG. 1) are represented as bulk capacitors in FIG. 2. Capacitors do not only have a capacitive behavior but also a small resistive and inductive behavior. Thus, the inductor (212), resistor (214), and capacitor (216) model the bulk capacitors. The parasitic behavior of the PCB planes (system power supply layer (14) and system ground layer (16) in FIG. 1) is modeled as resistors (218, 222) and inductors (220, 224).

In FIG. 2, the power distribution network may include multiple power supply planes and connections to a package (or multiple packages). The inherent series parasitics of the power distribution network are modeled by resistors (232, 236, 240, 244) and inductors (234, 238, 242, 246).

Multiple planes and interconnections between the planes may create parasitics in parallel with the power supply. In FIG. 2, inherent parallel parasitics created by the power distribution network are modeled. Also, additional capacitance in parallel with the power supply may help maintain a constant voltage. The additional capacitance may be connected between the power supply planes, for example, ceramic capacitors may connect between the system power supply plane and system ground plane. The inductance (226), resistance (228), and capacitance (230) model some of the parasitics and components in parallel with the power supply (202). Additional inherent parasitics and added capacitance local to the CPU may be modeled. The ceramic capacitors (22 in FIG. 1) and other inherent parasitics created by the package multiple planes and interconnections are modeled by inductor (248), resistor (250), and capacitor (252).

A package may connect to a CPU using a grid of solder bumps. In FIG. 2, the inherent parasitics created by the solder bumps are modeled by inductors (254, 258) and resistors (256, 260). On the CPU, various forms of chip capacitance may be used to further stabilize the power supply. Low equivalent series resistance (ESR) local decoupling capacitors are modeled by resistor (262) and capacitor (264). High ESR global decoupling capacitors are modeled by resistor (266) and capacitor (268). Non-switching logic on the CPU is modeled by resistor (270) and capacitors (272, 274). Switching logic on the CPU is modeled by variable resistors (276, 278) and capacitors (280, 282).

In FIG. 2, the schematic of the power distribution network may be used to simulate the impedance observed by the CPU, as represented by "Z." To simulate the impedance, a 1 Ampere AC current source (290) injects current onto power supply line (292). The measured voltage, $V_M$, between two power supply lines (292, 294) may be used to calculate the impedance. The impedance Z is equal to $V_M$ divided by 1 Ampere. By varying the frequency of the 1 Ampere AC current source (290), a frequency versus impedance graph may be drawn. Over a particular range of frequencies, the impedance increases because the circuit formed by the chip and package resonates. The resonance from the chip and package may affect the operation of the CPU.

SUMMARY OF INVENTION

According to one aspect of the present invention, an apparatus for reducing a power supply impedance of an integrated circuit comprises a package on which the integrated circuit is mounted; a power supply path on the package adapted to receive power from a power supply where the power supply path comprises a first power supply line and a second power supply line to provide power to the integrated circuit; at least one digital potentiometer connected between the first power supply line and the second power supply line to reduce the power supply impedance of the integrated circuit; and a test processor unit operatively connected to the at least one digital potentiometer where the at least one digital potentiometer is responsive to the test processor unit.

According to one aspect of the present invention, a method for reducing an impedance of a power supply path of an integrated circuit where the power supply path comprises a first power supply line and a second power supply line, the method comprises selectively adjusting a value of a digital potentiometer connected between the first power supply line and the second power supply line to reduce an impedance of the power supply path; determining the impedance of the power supply path of the integrated circuit; and storing a desired value determined from the selectively adjusting in a storage device.

According to one aspect of the present invention, an apparatus for reducing an impedance of a power supply path of an integrated circuit connected to the power supply path where the power supply path comprises a first power supply line and a second power supply line, the apparatus comprises means for selectively adjusting a value of a digital potentiometer connected between the first power supply line and the second power supply line to reduce an impedance of the power supply path; means for determining the impedance of the power supply path of the integrated circuit; and means for storing a desired value determined from the selectively adjusting in a storage device.

Other aspects and advantages of the invention will be apparent from the following description and the appended claims.

DETAILED DESCRIPTION

Embodiments of the present invention relate to an adjustment and calibration system for reducing a power supply impedance of an integrated circuit that is connected to a power supply via two power supply lines. At least one resistive element, controlled by the adjustment and calibration system, is connected between the two power supply lines and reduces the power supply impedance of the integrated circuit. The resistive element may be digitally controlled.

Figure 2:
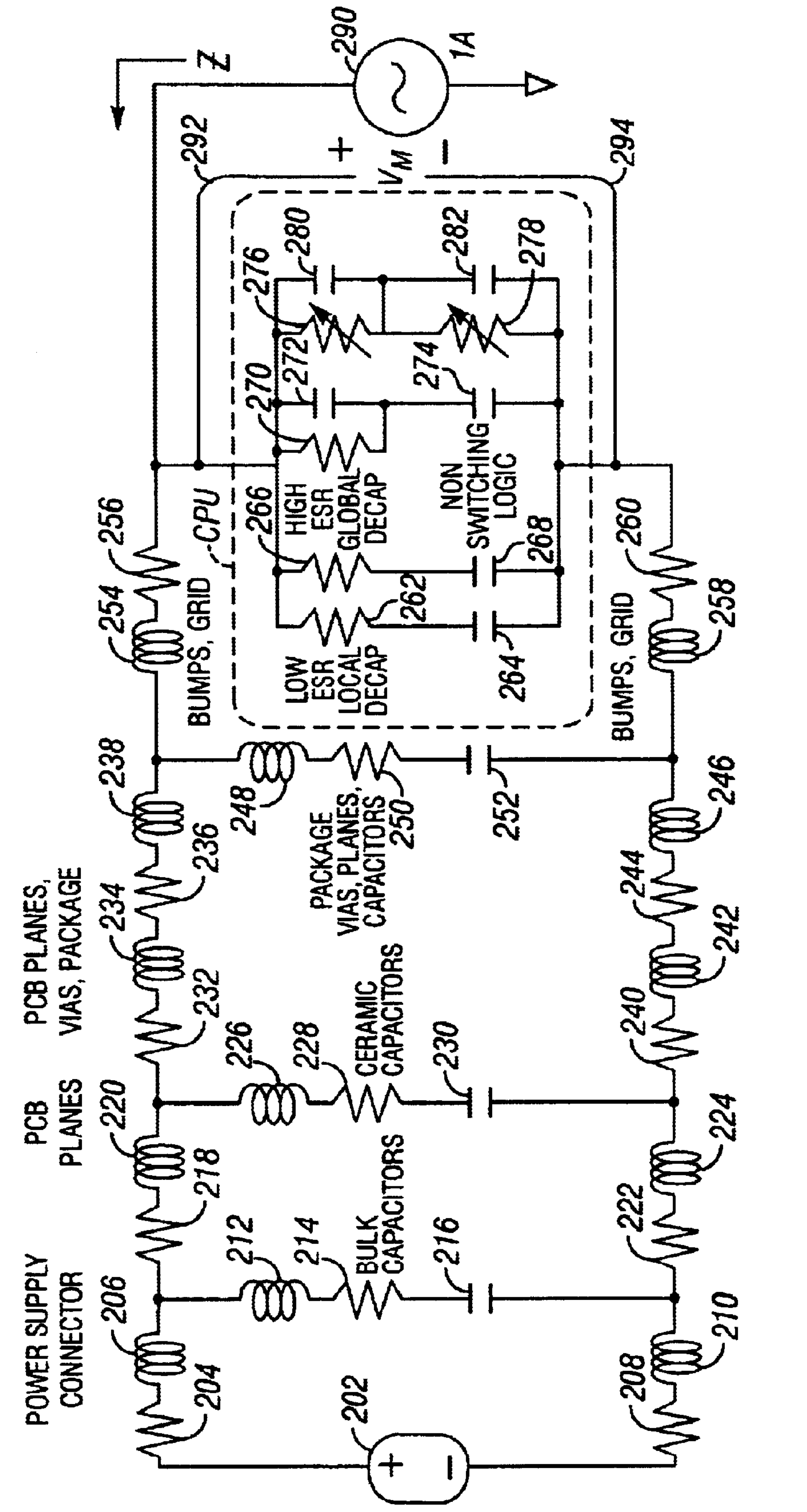
FIG. 2 shows a prior art schematic of a power distribution network for a central processing unit.

In FIG. 2, a prior art schematic of a power distribution network for a CPU is shown. The CPU is representative of any integrated circuit. The integrated circuit is powered through two power supply lines (292, 294).

In FIG. 2, a representative inductor (248), resistor (250), and capacitor (252) model the inherent parasitics created by the package and added capacitance between the two power supply lines (292, 294). The added capacitance is used to minimize the power supply noise created by the active switching of the integrated circuit. The inductor (248), resistor (250), and capacitor (252) in parallel with the integrated circuit parasitics and solder bump parasitics (254, 256, 258, 260) may form a circuit that will resonate at a frequency. The resonance, which is observed as a change in impedance, may be determined through simulation or laboratory testing.

In simulation, the impedance represented by Z observed by the integrated circuit may be determined by using a 1 Ampere AC current source (290) to excite the circuit shown in FIG. 2. As the frequency of the AC current source is varied, the measured voltage ($V_M$) between the two power supply lines (292, 294) is measured. The impedance may be determined by dividing the measured voltage, $V_M$, by the 1 Ampere AC current source (290) (i.e., Ohm's law).

Figure 4:
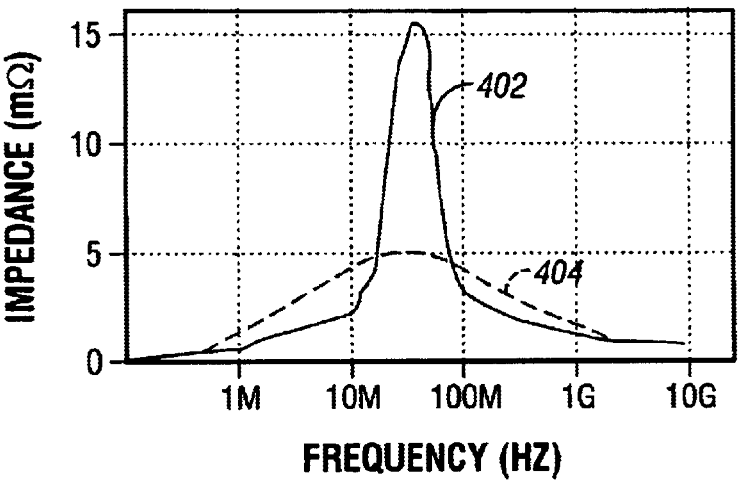
FIG. 4 shows a graph depicting the power supply system impedance of the circuit shown in FIGS. 2 and 3 in accordance with an embodiment of the present invention.

In FIG. 4, a representative drawing of the impedance (Z) as observed by the integrated circuit in FIG. 2 at different frequencies is shown with the graph (402). The impedance typically peaks between 10 MHz and 100 MHz. The inherent parasitics of the integrated circuit and package on which the integrated circuit is mounted interact with the inherent parasitics and added components of the power distribution network. The increase in impedance as observed by the integrated circuit occurs because a circuit created by the integrated circuit parasitics and package parasitics resonates. The inductor (248 in FIG. 2), resistor (250 in FIG. 2), and capacitor (252 in FIG. 2) that model the parasitics of the package may have a large effect on the amount of resonance.

Figure 3:
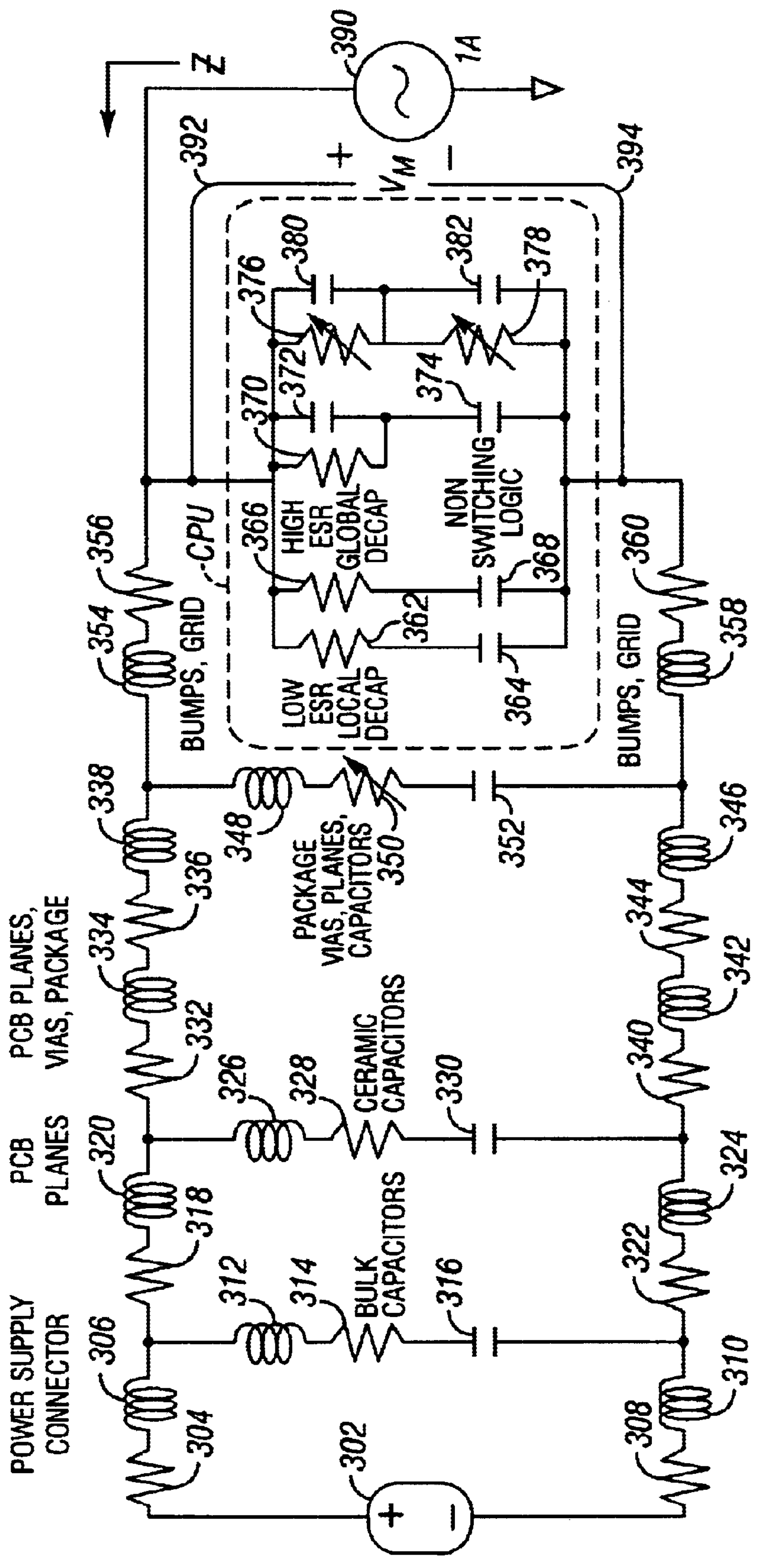
FIG. 3 shows a schematic of a power distribution network for a central processing unit in accordance with an embodiment of the present invention.

In FIG. 3, the inherent parasitics and added components are similar to the inherent parasitics and added components shown in FIG. 2. According to an embodiment of the present invention, the resistor (350) that models the resistance included in the package inductance (348), resistance (350), and capacitance (352) may be used to reduce the chip/package resonance. The inductance (348), resistance (350), and capacitance (352) are the result of inherent parasitics and added components on a package power supply path. The parasitics from the package included package vias (connections between power supply traces) and package planes. The package may include signal and power connection created by using signal and power supply traces. The signal and power supply traces may be arranged in planes. The planes may connect to other planes using vias. The inductance (348), resistance (350), and capacitance (352) are also the result of added capacitors on the package.

Figure 1:
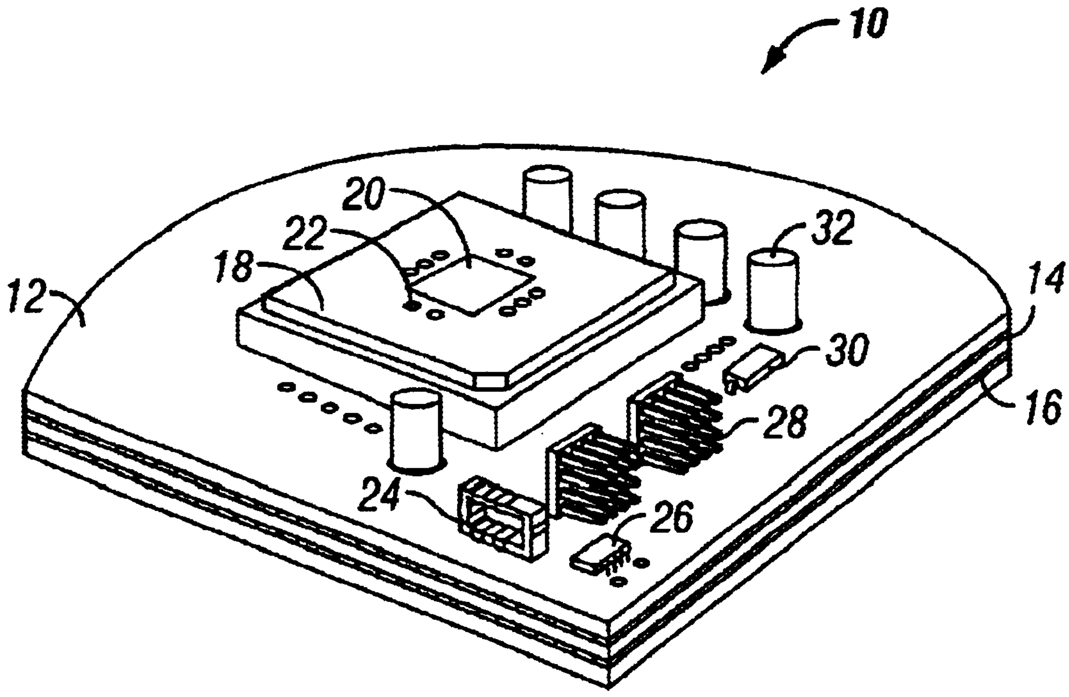
FIG. 1 shows a prior art depiction of a central processing unit system.

In FIG. 2, the resistance (250) is designed to be low to allow the on-chip capacitor, for example the ceramic capacitors (22 in FIG. 1) near the CPU (20 in FIG. 1), to quickly respond to any power supply noise. As shown in FIG. 4 with the graph (402), however, the parasitic tank circuit may increase the impedance through chip/package resonance. The graph (402) has a high Q factor, or quality factor. The quality of a signal, or Q factor, is a measure of the signal's maximum compared to the signal's width. A low Q factor is desirable because a low impedance improves the current flow to an integrated circuit.

In FIG. 3, the resistance (350) is increased compared to the resistance (250) in FIG. 2. An appropriately selected value for the resistance (350) changes the chip/package resonance. In simulation, the impedance represented by Z observed by the integrated circuit may be determined by using a 1 Ampere AC current source (390) to excite the circuit shown in FIG. 3. As the frequency of the AC current source is varied, the measured voltage ($V_M$) between the two power supply lines (392, 394) is measured. The impedance may be determined by dividing the measured voltage, $V_M$, by the 1 Ampere AC current source (390) (i.e., Ohm's law).

As a result of an embodiment of the present invention, FIG. 4 displays a representative graph (404) of the impedance as observed by the integrated circuit at Z in FIG. 3 at different frequencies using an appropriately selected value for the resistance (350 in FIG. 3). The graph (404) of the impedance has a reduced peak compared to graph (402). The increased resistance (350 in FIG. 3) creates a damping effect on the amount of resonance. An increase in the resistance value of the resistive element (350 in FIG. 3) will reduce the peak (Q factor) of the impedance Z observed by the integrated circuit.

Those with ordinary skill in the art will appreciate that the resistance (350), or resistive element, connects between two power supply lines. A power supply line may be composed of multiple power supply traces. Each power supply trace may have a similar voltage and may originate from a common source. The resistance (350) may be connected to any of the multiple power supply traces to create a connection to the power supply line.

Figure 5:
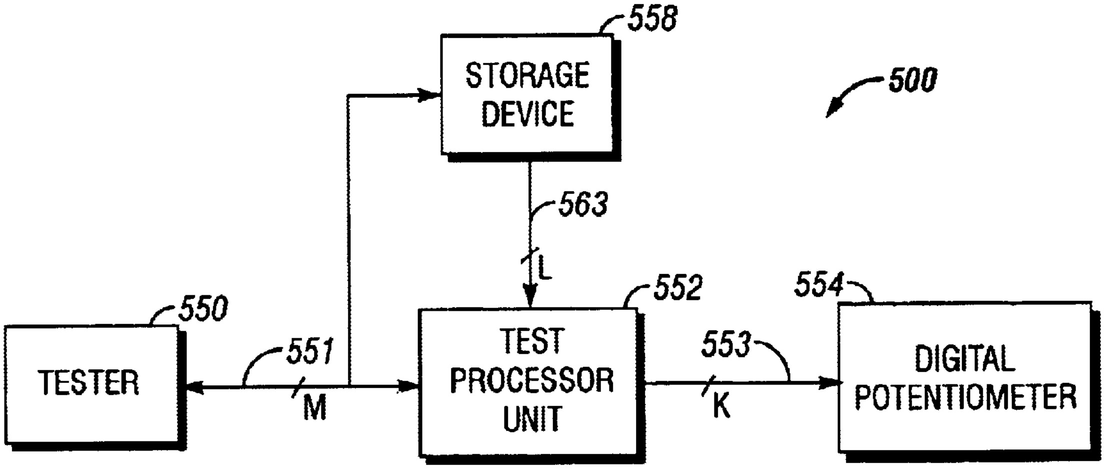
FIG. 5 shows an adjustment and calibration system diagram in accordance with an embodiment of the present invention.

FIG. 5 shows an embodiment of an adjustment and calibration system (500) in accordance with the invention. A test processor unit (552) controls a digital potentiometer (554) using multiple adjustment signals K (553). The digital potentiometer (554) is an adjustable resistor responsive to a binary word that is K bits wide. The digital potentiometer (554) is used to adjust the impedance as observed by the integrated circuit. For example, the digital potentiometer (554) is used to adjust the resistance (350) in FIG. 3.

The values of the multiple adjustment signals K (553) are determined by the test processor unit (552). The test processor unit (552) may communicate through a host interface (not shown) using M communication lines (551). Those with ordinary skill in the art will appreciate that the host interface and M communication lines (551) may take a wide variety of forms. The communication may be defined by an industry standard.

The host interface (not shown) may be used to operatively connect to a separate computer system. For example, a tester (550) communicates with the test processor unit (552). The tester (550) instructs the test processor unit (552) to adjust the digital potentiometer (554). The tester (550) measures the maximum operating frequency of the CPU. The CPU maximum operating frequency may be used as a representation of the chip/package impedance. The tester (550) may use the CPU maximum operating frequency to determine the effect of the adjustment. A variety of different adjustments may be made in an effort to identify the adjustment settings that produce the CPU maximum operating frequency. For example, the tester (550) may be used to adjust the digital potentiometer (554) to modify the chip/package impedance. The digital potentiometer (554) may be adjusted until the CPU maximum operating frequency is obtained.

A storage device (558) may be designed to store control information representative of the adjustment settings that produce the desired CPU operating frequency. Using the tester (550), control information may be written into the storage device (558). The tester (550) may read or rewrite the control information in the storage device (558).

The storage device (558) may include multiple storage elements such that the control information may be represented by a binary word. For example, the control information stored in the storage device (558) may be a binary word that matches the desired values of the multiple adjustment signals K (553). Alternatively, the control information may be a binary encoded word. For example, if the multiple adjustment signals K (553) use eight adjustment signals, the control information might be represented with a three bit binary word. Alternatively, the control information may contain instructions, interpreted by the test processor unit (552), to control the multiple adjustment signals K (553).

In one or more embodiments, the tester (550) may be removed from the adjustment and calibration system (500). The test processor unit (552) may read the storage device (558) to obtain the control information and determine the amount of adjustment that should occur in the digital potentiometer (554). After the test processor unit (552) reads the control information in the storage device (558) and adjusts the digital potentiometer (554), the CPU maximum operating frequency may be similar to the CPU maximum operating frequency obtained while connected to the tester (550). The test processor unit (552) reads the control information from storage device (558) using the L signal lines (563). An adjustable impedance CPU system may be formed by incorporating the test processor unit (552), storage device (558), and digital potentiometer (554) in FIG. 3 where the digital potentiometer (554) adjusts the resistance (350 in FIG. 3).

Those with ordinary skill in the art will appreciate that the digital potentiometer (554) may include resistance values that are selected dependent on the inherent and added resistance external to the digital potentiometer (554). For example, the resistance provided by the digital potentiometer (554) may only be a part of the resistance (350 in FIG. 3). The resistance (350 in FIG. 3) may model the resistance of the digital potentiometer (554) and the resistance from a variety of different sources including, but not limited to, a resistor, potentiometer, equivalent series resistance that is inherent in a capacitor, power supply traces (or connections) that connect components (e.g., resistors, inductors, capacitors) to the power distribution network, the package, and the integrated circuit.

Those with ordinary skill in the art will appreciate that using the CPU maximum operating frequency to determine the impedance is only one possible method. The impedance at different frequencies may be measured directly by using a network analyzer. Alternately, an oscilloscope may measure the amount of power supply noise present at a location close to the CPU (20 in FIG. 1).

Those with ordinary skill in the art will appreciate that the CPU (20 in FIG. 1) may have several isolated power supply networks. For example, a power supply network for the CPU (20 in FIG. 1) logic may be different than a power supply network for the CPU (20 in FIG. 1) input/output circuits. A similar voltage may be specified for these power supply networks; however, the power supply networks are isolated to reduce the affects of noise. An adjustment and calibration system (500) may be used to reduce the impedance as observed by the integrated circuit with respect to an isolated power supply network. The digital potentiometer (554) may be used to adjust the impedance. For example, the impedance of the power supply network for the CPU (20 in FIG. 1) input/output circuits may be adjusted. The test processor unit (552) adjusts the digital potentiometer (554) to vary the impedance. The maximum input/output bandwidth may be used as a measure of impedance.

Figure 6:
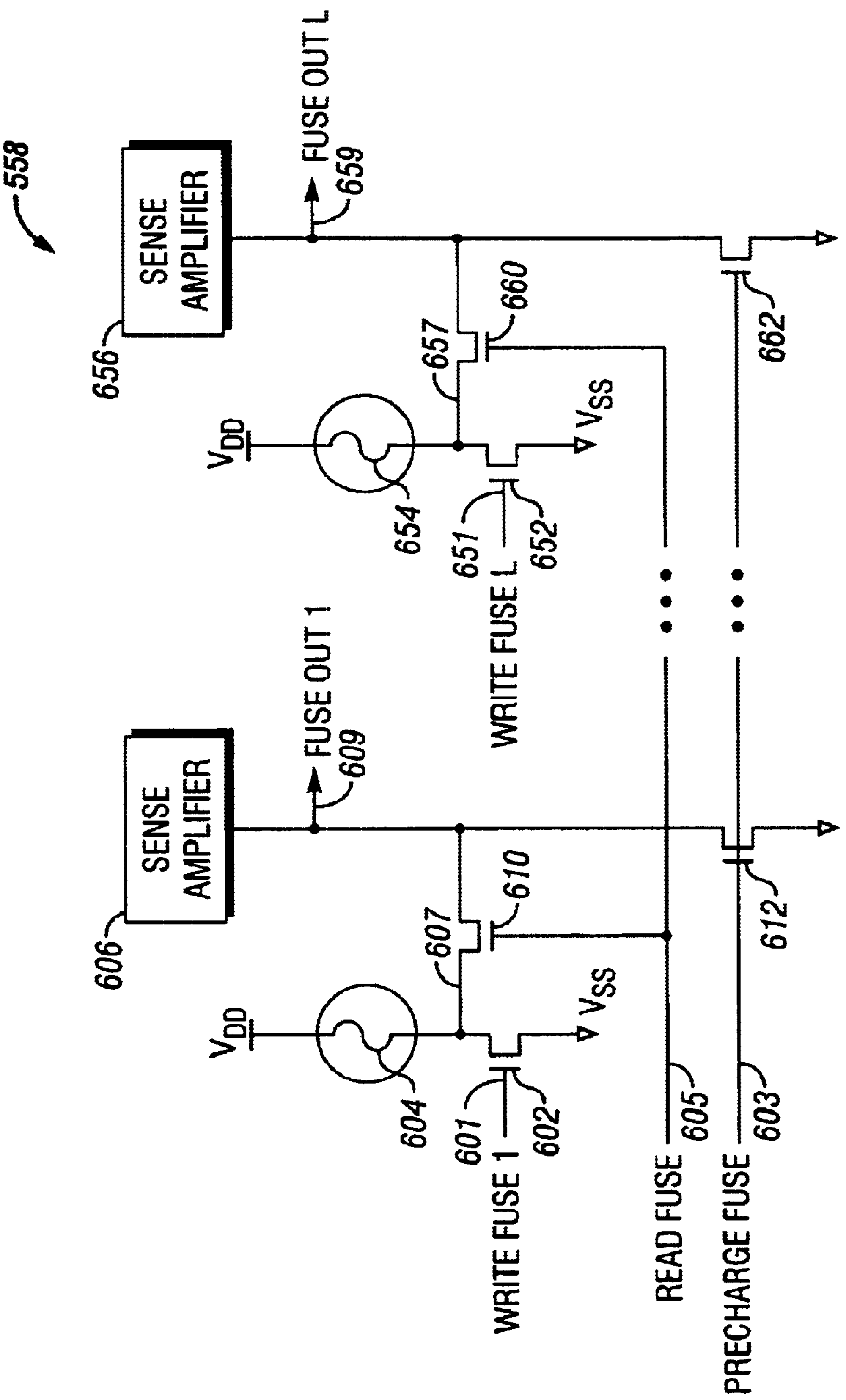
FIG. 6 shows a storage device schematic diagram in accordance with an embodiment of the present invention.

FIG. 6 shows a storage device (558) in accordance with an embodiment of the present invention. The storage device (558) includes electrically programmable fuses (604, 654) to store nonvolatile control information. Those skilled in the art will appreciate that the storage device (558) may take forms other than the exemplary configuration shown without departing from the scope of the invention.

In FIG. 6, multiple write signals such as write fuse 1 (601) through write fuse L (651) are used to program electrically programmable fuses (604, 654), respectively. A "high" voltage on write fuse 1 (601) and write fuse L (651) cause n-channel transistors (602, 652), respectively, to turn "on." If n-channel transistors (602, 652) are "on" for a sufficient duration, the fuse (604) and fuse (654), respectively, will create an "open" circuit. A precharge fuse (603) signal will pulse a "high" voltage on the gates of n-channel transistors (612, 662) to momentarily turn them "on." If n-channel transistors (612, 662) are "on," fuse out 1 (609) and fuse out L (659) will be pulled to a "low" voltage by n-channel transistors (612, 662). The "low" voltage on fuse out 1 (609) and fuse out L (659) will precharge fuse out 1 (609) and fuse out L (659) in anticipation of a read operation.

In FIG. 6, a "high" voltage on read fuse (605) will cause n-channel transistors (610, 660) to turn "on." If any of the fuses (604, 654) are intact (i.e., shorted), fuse out 1 (609) and fuse out L (659) will be pulled to a "high" voltage.

If any of the fuses (604, 654) are open, fuse out 1 (609) and fuse out L (659) will remain at a "low" voltage. The sense amplifiers (606, 656) will sense the voltage levels on fuse out 1 (609) and fuse out L (659), respectively, to amplify and maintain the voltage levels.

Figure 7:
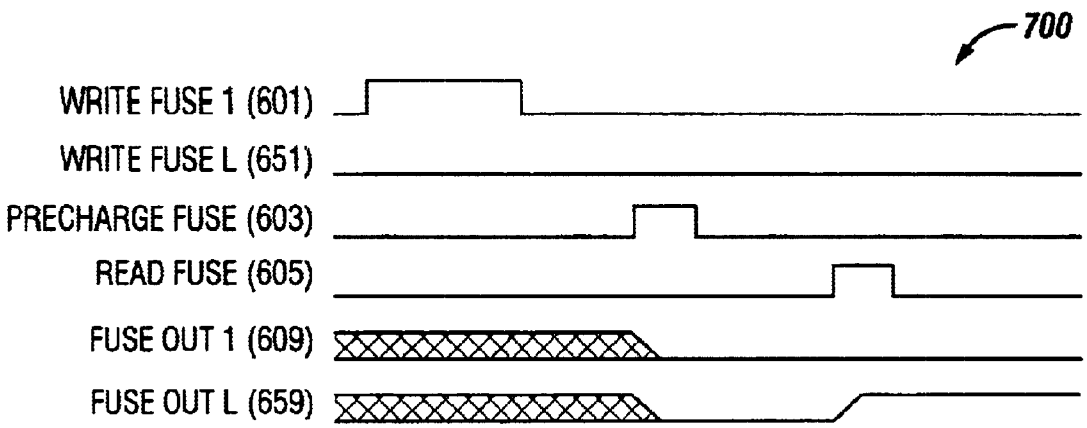
FIG. 7 shows a timing diagram in accordance with an embodiment of the present invention for the storage device schematic diagram shown in FIG. 6.

FIG. 7 shows a timing diagram (700) related to the programming of storage device (558) in accordance with an embodiment of the present invention. In this example, write fuse 1 (601) is pulsed to a "high" voltage to create an "open" on fuse (604). Write fuse L (651) remains at a "low" voltage to leave fuse (604) intact. Precharge fuse (603) signal pulses a "high" voltage to pull fuse out 1 (609) and fuse out L (659) to a "low" voltage. Read fuse (605) pulses a "high" voltage to read the state of the fuses (604, 654). Because fuse (604) is "open", fuse out 1 (609) remains at a "low" voltage. Because fuse (654) is intact or "shorted", fuse out L (659) is pulled to a "high" voltage.

Because the fuses (604, 654) have been programmed and read, fuse out 1 (609) and fuse out L (659) maintain the programmed control information. The state of the fuses (604, 654) may be read at any time by observing the voltage level on fuse out 1 (609) and fuse out L (659). Also, the state of the fuses (604, 654) may be read by repeating the precharge and read cycles. Using multiple fuses and related circuitry, a binary word may represent the stored control information.

One of ordinary skill in the art will appreciate that the electrically programmable fuses are but one method to store information. The storage device (558 in FIG. 5) may contain a wide variety of types of storage elements including, but not limited to, an electrically programmable fuse, an electrically programmable read only memory, an electrically erasable read only memory, a one time programmable memory, a flash memory, a laser programmable fuse, and a laser programmable anti-fuse.

Figure 8:
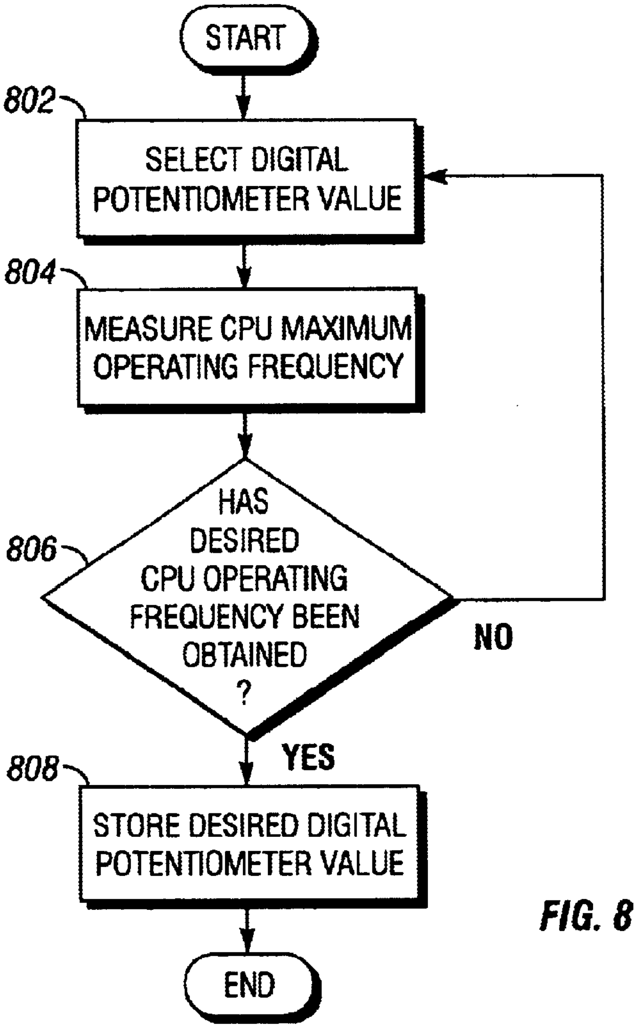
FIG. 8 shows a flow diagram in accordance with an embodiment of the present invention.

FIG. 8 shows a flow diagram in accordance with an embodiment of a method according to the invention. Initially, a digital potentiometer value is selected (802). The selected digital potentiometer value may be used to adjust the digital potentiometer (554 shown in FIG. 5). The digital potentiometer (554 shown in FIG. 5) may adjust the chip/package impedance. The CPU maximum operating frequency may then be measured (804).

Next, a determination as to whether a desired CPU operating frequency is obtained (806). The determination may be based on a CPU operating frequency taken with the selected digital potentiometer value, or an interpolation or extrapolation from data obtained from selectively adjusting the digital potentiometer value. If the desired CPU operating frequency has not been obtained, these steps (802) and (804) are repeated until a desired CPU operating frequency has been obtained (806). If the desired CPU operating frequency has been obtained (806), the digital potentiometer value, or a representation of the digital potentiometer value, is stored (808). The desired digital potentiometer value or representation of the digital potentiometer value is stored as control information in the storage device (558 in FIG. 5). The storage device (558 in FIG. 5) may contain control information that may be accessed and used to improve the chip/package resonance.

Those with ordinary skill in the art will appreciate that using the CPU maximum operating frequency to determine the impedance is only one possible method. The impedance at different frequencies may be measured directly by using a network analyzer. Alternately, an oscilloscope may measure the amount of power supply noise present at a location close to the CPU (20 in FIG. 1). Steps (804) and (806) may be changed to use the network analyzer or the oscilloscope measurements instead of the CPU operating frequency measurement to decide an appropriate digital potentiometer value.

Those with ordinary skill in the art will appreciate that the CPU (20 in FIG. 1) may have several isolated power supply networks. For example, a power supply network for the CPU (20 shown in FIG. 1) logic may be different than a power supply network for the CPU (20 shown in FIG. 1) input/output circuits. A similar voltage may be specified for these power supply networks; however, the power supply networks are isolated to reduce the affects of noise. An adjustment and calibration system (500 shown in FIG. 5) may be used to reduce the impedance as observed by the integrated circuit with respect to an isolated power supply network. The digital potentiometer (554 shown in FIG. 5) may be used to adjust the impedance. For example, the impedance of the power supply network for the CPU (20 shown in FIG. 1) input/output circuits may be adjusted. The test processor unit (552 shown in FIG. 5) adjusts the digital potentiometer (554 shown in FIG. 5) to vary the impedance. Accordingly, steps (804) and (806) may measure the maximum input/ output bandwidth as a measure of the impedance for the power supply network for the CPU (20 shown in FIG. 1) input/output circuits. The impedance of the power supply network for the CPU (20 shown in FIG. 1) input/output circuits at different frequencies may be measured directly by using a network analyzer. Alternately, an oscilloscope may measure the amount of power supply noise present at a location close to the CPU (20 in FIG. 1) for the power supply network for the CPU (20 shown in FIG. 1) input/output circuits.

Advantages of the present invention may include one or more of the following. The CPU system (10 in FIG. 1), having been fabricated, may demonstrate a CPU maximum operating frequency that may not have been apparent from simulation. In some embodiments, because the digital potentiometer (554 in FIG. 5) may modify the chip/package resonance of the adjustable impedance CPU system, the adjustable impedance CPU system may be calibrated.

In one or more embodiments, because the adjustable impedance CPU system may be fabricated with a means for adjusting the chip/package resonance, fewer design iterations and higher confidence in the adjustable impedance CPU system operating frequency may be afforded. Likewise, the adjustable impedance CPU system impedance may be realistically determined and calibrated to minimize the chip/package resonance.

In one or more embodiments, the tester (550 in FIG. 5) and test processor unit 552 in FIG. 5) may communicate so that the state of the digital potentiometer (554 in FIG. 5) may be obtained, chip/package resonance analyzed, and/or adjustments made to the digital potentiometer (554 in FIG. 5). Using the tester (550 in FIG. 5), control information may be stored in the storage device (558 in FIG. 5).

In one or more embodiments, the tester (550 in FIG. 5) may take a relatively long time to determine the desired digital potentiometer value and program the control information. Because the control information is programmed, the digital potentiometer (554 in FIG. 5) may quickly (for example, within a few nanoseconds) adjust the adjustable impedance CPU system to obtain proper operation.

In one or more embodiments, a limited number of adjustable impedance CPU systems may need to be tested to determine the desired value for the control information for a larger number of adjustable impedance CPU systems.

In one or more embodiments, because the digital potentiometer (554 in FIG. 5) is adjusted, the chip/package peak impedance may be reduced. A capacitor with a higher equivalent series inductance may be used with the digital potentiometer (554 in FIG. 5) that dampens the peak impedance created by the increased inductance. The capacitor with a higher equivalent series inductance may be less expensive than the capacitor with a lower equivalent series inductance.

In one or more embodiments, at least one of the resistance values provided by the digital potentiometer (554 in FIG. 5) may be selected using simulation. At least one of the resistance value provided by the digital potentiometer (554 in FIG. 5) may be selected as part of the manufacture of the package. At least one of the resistance value provided by the digital potentiometer (554 in FIG. 5) may be selected after measuring parameters from the integrated circuit, integrated circuit package, and/or power distribution network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for reducing a power supply impedance of an integrated circuit, comprising:

a package on which the integrated circuit is mounted;

a power supply path on the package adapted to receive power from a power supply, wherein the power supply path comprises a first power supply line and a second power supply line to provide power to the integrated circuit;

at least one digital potentiometer connected between the first power supply line and the second power supply line to reduce the power supply impedance of the integrated circuit; and a test processor unit operatively connected to the at least one digital potentiometer, wherein the at least one digital potentiometer is responsive to the test processor unit.

2. The apparatus of claim 1, further comprising:

a tester adapted to communicate with the test processor unit.

3. The apparatus of claim 1, further comprising:

a storage device adapted to store control information, wherein the test processor unit is adapted to read the control information to determine the desired value of the at least one digital potentiometer.

4. The apparatus of claim 3, the control information comprising a binary word.

5. The apparatus of claim 3, the control information comprising an instruction.

6. The apparatus of claim 3, further comprising:

a tester operatively connected to the storage device, wherein the tester is adapted to selectively write at least a portion of the control information to the storage device.

7. The apparatus of claim 6, wherein the test processor unit, dependent on the tester, is adapted to selectively read at least a portion of the control information from the storage device in order to selectively adjust the digital potentiometer.

8. The apparatus of claim 3, further comprising:

a tester operatively connected to the storage device, wherein the tester is adapted to selectively read at least a portion of the control information to the storage device.

9. The apparatus of claim 8, wherein the test processor unit, dependent on the tester, is adapted to selectively read at least a portion of the control information from the storage device in order to selectively adjust the digital potentiometer.

10. The apparatus of claim 3, the storage device comprising at least one storage element, wherein the storage element is at least one selected from the group consisting of an electrically programmable fuse, an electrically programmable read only memory, an electrically erasable read only memory, a one-time programmable memory, a flash memory, a laser programmable fuse, and a laser programmable anti-fuse.

* * * * *